US012618793B2

(12) United States Patent
Alfareed et al.

(10) Patent No.:  US 12,618,793 B2
(45) Date of Patent:  May 5, 2026

(54) MOLYBDENUM OXIDE AND COBALT OXYHYDROXIDE COMPOSITE ELECTROCHEMICAL GLUCOSE SENSOR

(71) Applicant: Imam Abdulrahman Bin Faisal University, Dammam (SA)

(72) Inventors: Tahani Alfareed, Dammam (SA); Jwaher M. Alghamdi, Dammam (SA); Emre Cevik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 643 days.

(21) Appl. No.: 18/072,209

(22) Filed: Nov. 30, 2022

(65) Prior Publication Data

US 2024/0175842 A1     May 30, 2024

(51) Int. Cl.
| | |
|---|---|
| *B32B 15/04* | (2006.01) |
| *B22F 3/10* | (2006.01) |
| *B32B 17/06* | (2006.01) |
| *G01N 27/30* | (2006.01) |
| *G01N 27/327* | (2006.01) |

(52) U.S. Cl.
CPC ............. *G01N 27/327* (2013.01); *B22F 3/10* (2013.01); *G01N 27/308* (2013.01); *G01N 27/3277* (2013.01)

(58) Field of Classification Search
CPC .................................................... G01N 27/327
USPC ................................................. 428/701, 702
See application file for complete search history.

(56) References Cited

U.S. PATENT DOCUMENTS

| | | | | |
|---|---|---|---|---|
| 8,889,065 | B2 * | 11/2014 | Chelluri ................... | B22F 1/16 |
| | | | | 419/13 |
| 11,862,444 | B2 * | 1/2024 | Franzke .............. | C04B 35/6455 |
| 2014/0057112 | A1 * | 2/2014 | Lang ................... | C01G 23/003 |
| | | | | 106/440 |

FOREIGN PATENT DOCUMENTS

| | | |
|---|---|---|
| CN | 102313768 A | 1/2012 |
| CN | 111239220 A | 6/2020 |
| CN | 110346437 B | 3/2022 |
| JP | 2018-124211 A | 8/2018 |

(Continued)

OTHER PUBLICATIONS

Gao, et al. ; Enzyme-free amperometric glucose sensor using a glassy carbon electrode modified with poly(vinyl butyral) incorporating a hybrid nanostructure composed of molybdenum disulfide and copper sulfide ; Microchim Acta (2017) ; Jan. 7, 2017 ; 8 Pages.

(Continued)

*Primary Examiner* — Lauren R Colgan
(74) *Attorney, Agent, or Firm* — Oblon, McClelland, Maier & Neustadt, L.L.P.

(57) ABSTRACT

A composite is provided which comprises planar molybdenum oxide microstructures and cobalt oxyhydroxide microstructures disposed on the planar molybdenum oxide microstructures. A method of forming the composite is also provided. The composite is used in the fabrication of an electrochemical sensor, which comprises the composite, an electrode, and a polymeric coating. The electrochemical sensor is used in a method of detecting the presence of glucose in an analyte. The method involves applying a voltage to the electrochemical sensor relative to a counter electrode and measuring a current response. The method in insensitive to common oxidative interfering analytes such as urea, lactate, and NaCl.

20 Claims, 7 Drawing Sheets

(56)                 References Cited

FOREIGN PATENT DOCUMENTS

| WO | 2008/031122 A1 | 3/2008 |
| WO | 2019/164111 A1 | 8/2018 |

OTHER PUBLICATIONS

Mendoza-Sanchez, et al. ; Charge storage properties of a _-MoO3/carboxyl-functionalized single-walled carbon nanotube composite electrode in a Li ion electrolyte ; Electrochimica Acta 98 (2013) ; Mar. 11, 2013 ; 9 Pages.

* cited by examiner

FIG. 3A.
FIG. 3B.
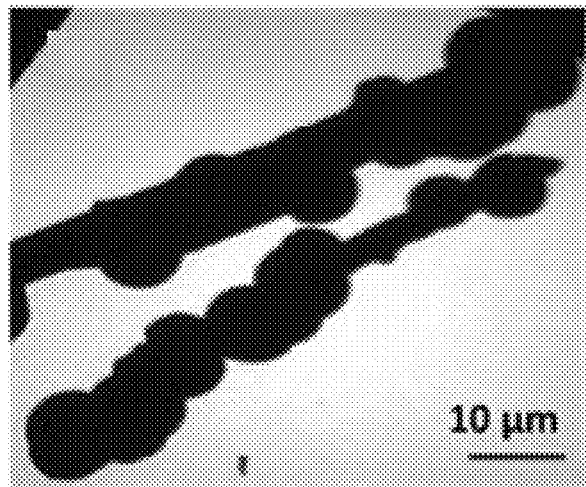
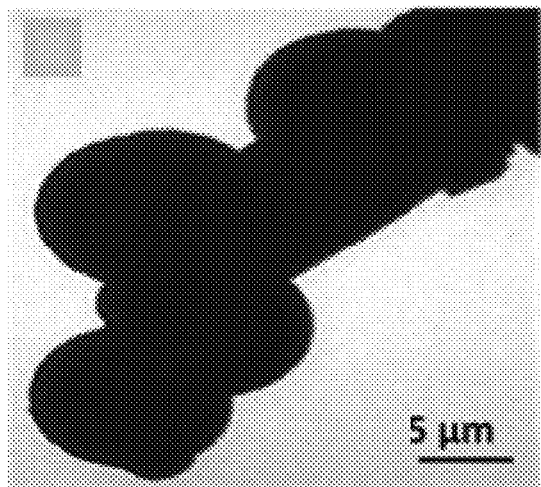
FIG. 4A.
FIG. 4B.
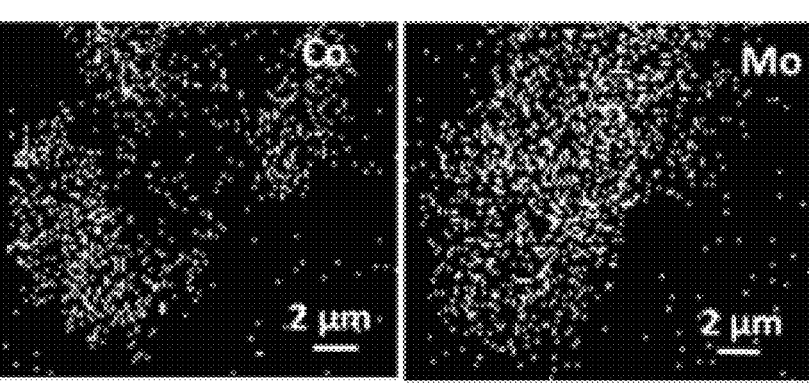
FIG. 4C.
FIG. 4D.
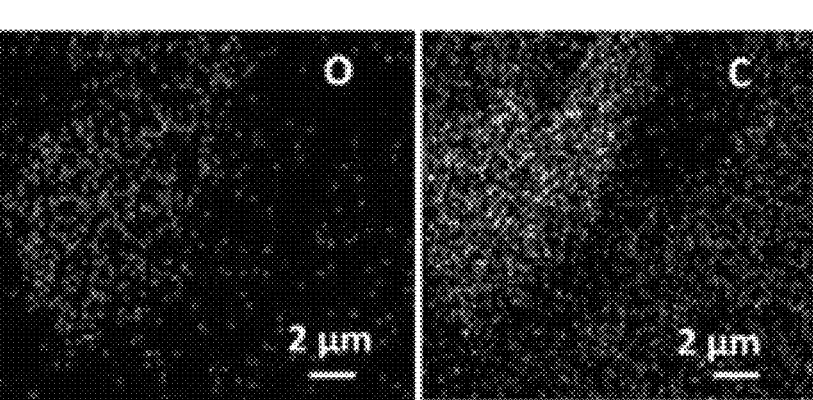

FIG. 7A.
FIG. 7B
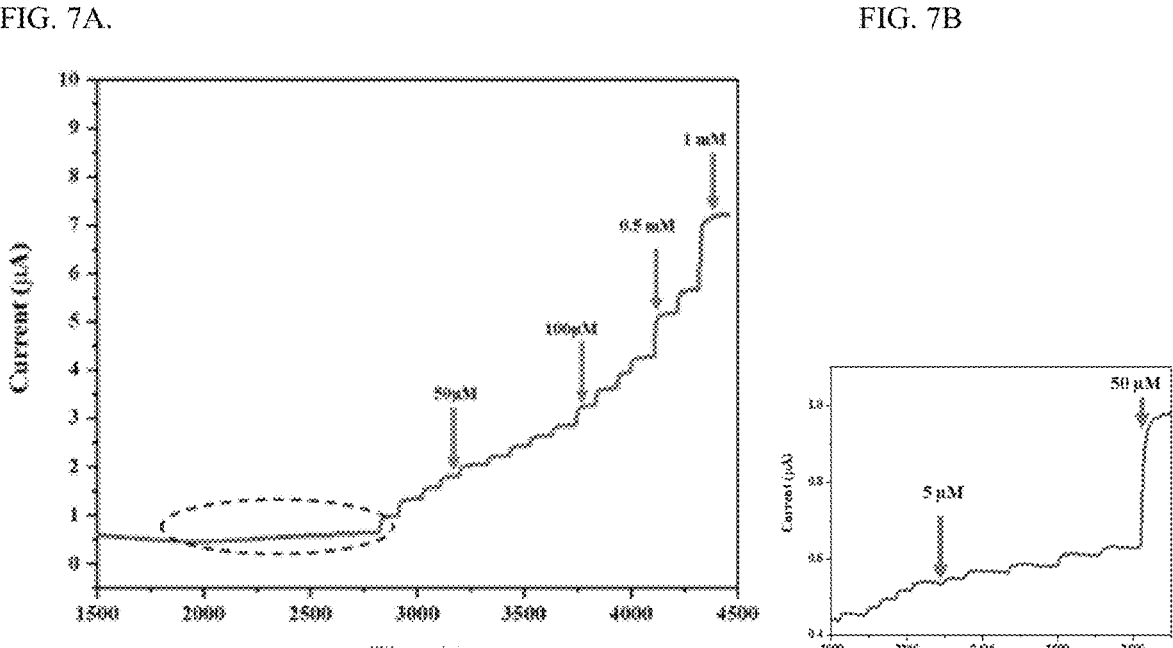
FIG. 7C.
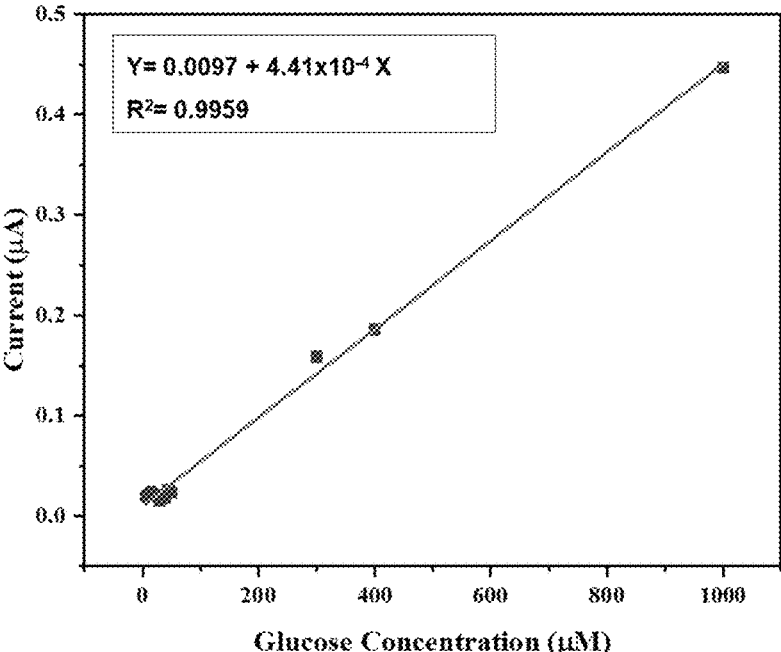

MOLYBDENUM OXIDE AND COBALT OXYHYDROXIDE COMPOSITE ELECTROCHEMICAL GLUCOSE SENSOR

BACKGROUND OF THE INVENTION

Field of the Invention

The present disclosure relates to a composite which includes planar molybdenum oxide microstructures and cobalt oxyhydroxide microstructures, a method of forming the composite, an electrochemical sensor which includes the composite, and a method of detecting glucose in an analyte using the electrochemical sensor.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The glucose sensor is a critical tool in fields such as biotechnology, clinical healthcare, and food analysis. Glucose sensors have allowed reliable, rapid glucose sensing with high sensitivity [Lamiri, L., et. al., Synthetic Metals, 2020, 266, 116437]. Several sensing paradigms have been used to fabricate glucose sensors. Electrochemical sensing is one of the most convenient and effective glucose sensing techniques, in part due to low cost, high sensitivity, fast response time, and easy operation [Manafi-Yeldaghermani, R., et. al., Microchemical Journal, 2021, 169, 106636; and Emir, G., et. al., Microchemical Journal, 2021, 161, 105751]. Of electrochemical sensors, enzymatic modified sensors are by far the most studied. However, there are difficulties and drawbacks related to the use of enzymes in glucose sensing. Importantly, enzymatic sensors exhibit poor stability from the inherent fragility of enzymes, costly and stringent storage conditions (e.g., pH, temperature, humidity), challenging enzyme immobilization processes during fabrication, and high costs [Savk, A. et. al., Journal of Molecular Liquids, 2020, 300, 112355; and Abbasi, A. R., et. al., Journal of Inorganic and Organometallic Polymers and Materials, 2020, 30, 2027-2038].

Factors to consider in the preparation of practical non-enzymatic glucose sensors include the use of materials which are inexpensive, selective, stable, and biocompatible [Wang, F., et. al., Polymers, 2020, 12, 10, 2419]. Examples of such materials include transition metals and metal oxides and hydroxides, polymers, and carbon nanomaterial [Mo, G., et. al., Talanta, 2021, 225, 121954; Wei, H., et. al., Sensors and Actuators B: Chemical, 2021, 337, 129687; Zhao, Z., et. al., Sensors and Actuators B: Chemical, 2021, 326, 128811; Zhang, Y., et. al., Sensors and Actuators B: Chemical, 2020, 309, 127779; and Jeong, H., et. al., Materials Science and Engineering C, 2021, 118, 111510]. Among various metal compounds, the nanostructured metal oxides have recently noticed in biosensor development due to their remarkable advantages in the factors described above [Karthika, A., et. al., Microchemical Journal, 2019, 145, 737-744; and Karthika, A., et. al., Ultrasonics Sonochemistry, 2019, 55, 196-206].

One of the most promising transition metal oxides for use in electrochemical sensors is molybdenum trioxide ($MoO_3$) owing to the distinctive chemical properties such as chemical and thermal stability, band gap energy of 2.39-2.9 eV, and multiple accessible oxidation states [Ramana, C. V., and Julien, C. M., Chemical Physics Letters 2006, 428, 1-3, 114-118; and Zhao, D., et. al., Materials Letters, 2019, 256, 126648]. $MoO_3$ has been used in applications including smart windows, optical devices, electrochemical storage, sensors, and catalysis [Mai, L. Q., et. al., Microelectronic Engineering, 2003, 66, 1-4, 199-205]. However, $MoO_3$ has disadvantages in electrochemical sensing including low sensitivity, high oxidation potential, facile aggregation, fouling, and decreases in electrocatalytic activity [Mohamed Azharudeen, A., et. al., Microchemical Journal, 2020, 157, 105006].

One approach to overcoming limitations in a single material is to prepare hybrid materials, which can combine advantages from different components to cover the disadvantages in certain materials. For example, Lee, et. al. prepared an electrochemical glucose sensor from the combination of an Au—Ni alloy and a conductive polymer. [Lee, W. C., et. al., Biosensor and Bioelectronics, 2019, 130, 48-54]. Khalaf, et. al. prepared an electrochemical glucose sensor from silver nanoparticles and chitosan [Khalaf, et. al., International Journal of Biological Macromolecules, 2020, 146, 763-772]. Jo, et. al. prepared a glucose sensor based on Ni—Co mixed oxide nanoneedles decorated with polymer dots [Jo, et. al., Journal of Industrial and Engineering Chemistry, 2020, 89, 25, 485-493]. Gao, et. al. prepared an electrochemical glucose sensor from a combination of molybdenum disulfide and copper sulfide coated with poly (vinyl butyral) [Gao, Z. et. al., Microchimica Acta, 2017, 184, 807-814]. Li, et. al. prepared "cobalt-functionalized $MoS_2$" and carbon nanotube composites for electrochemical glucose sensing. [Sensors and Actuators B: Chemical, 2019, 293, 122-128].

Accordingly, it is an objective of the present disclosure to provide a composite useful for fabricating an enzyme-free electrochemical glucose sensor and such a sensor which has high stability, high sensitivity, rapid response time, and wide sensing range.

SUMMARY OF THE INVENTION

The present disclosure relates to a composite, comprising planar molybdenum oxide microstructures having a mean thickness of 0.5 to 5 μm and a mean width of 1 to 10 μm; and cobalt oxyhydroxide microstructures having a mean size of 1 to 8 μm disposed on a surface of the planar molybdenum oxide microstructures, wherein the molybdenum oxide is crystalline by PXRD and the cobalt oxyhydroxide is crystalline by PXRD.

In some embodiments, the molybdenum oxide is $\alpha$-$MoO_3$.

In some embodiments, the composite is substantially free of a metal hydroxide material by PXRD.

In some embodiments, the composite is substantially free of a carbon nanomaterial.

The present disclosure also relates to method of forming the composite, the method comprising mixing a molybdenum source and an aminotriazole to form a first intermediate, calcining the first intermediate at 500 to 900° C. for 1 to 12 hours to form planar molybdenum oxide microstructures, treating the planar molybdenum oxide microstructures with an acid to form activated microstructures, mixing the activated microstructures, a cobalt ion source, and water to form a reaction mixture, and hydrothermally treating the reaction mixture at 175 to 245° C. for 12 to 96 hours to form the composite.

In some embodiments, the molybdenum source is ammonium molybdate.

In some embodiments, the aminotriazole is 3-amino-1H, 2,4-triazole.

In some embodiments, the cobalt ion source is cobalt (II) nitrate.

The present disclosure also relates to an electrochemical sensor, comprising an electrode, the composite disposed on the electrode, and a polymeric coating disposed on the composite.

In some embodiments, the electrochemical sensor is substantially free of an enzyme.

In some embodiments, the electrode is a glassy carbon electrode, and the polymeric coating is Nafion.

In some embodiments, the electrochemical sensor has an anodic peak centered at greater than 0.2 to 0.28 V and a cathodic peak centered at 0.15 to 0.2 V as measured vs Ag/AgCl in 0.1 M NaOH.

The present disclosure also relates to a method of detecting the presence of glucose in an analyte, the method comprising immersing a working electrode comprising the electrochemical sensor, a reference electrode, and a counter electrode in an analyte comprising a dilute hydroxide base, applying a voltage to the working electrode and counter electrode, measuring a current response to determine at least one selected from a cathodic peak voltage, an anodic peak voltage, and a steady-state current, and determining the presence of glucose in the analyte based on at least one selected from the group consisting of the cathodic peak voltage, the anodic peak voltage, and the steady-state current.

In some embodiments, the voltage is applied in a range of 0.01 to 0.5 V.

In some embodiments, the dilute hydroxide base is 0.1 M NaOH.

In some embodiments, the analyte has a pH of 8 to 14.

In some embodiments, the reference electrode is an Ag/AgCl electrode.

In some embodiments, the method has a glucose detection limit of 10 to 100 μM.

In some embodiments, the method has a glucose sensitivity of 4 to 8 μA mM$^{-1}$ cm$^{-2}$.

In some embodiments, the method has a linear amperometric current response in a glucose concentration range of 0.001 to 5.0 mM.

BRIEF DESCRIPTION OF THE DRAWINGS

FIGS. 3A-3B are transmission electron microscopy (TEM) images of MoCo composite at low and high magnification, respectively.

FIGS. 4A-4B are elemental maps of a sample of MoCo composite where FIG. 4A is for cobalt, FIG. 4B. is for molybdenum, FIG. 4C is for oxygen, and FIG. 4D is for carbon.

FIG. 7A shows the amperometric response of modified GCE/MoCo/Nafion upon successive addition of glucose in 0.1 M NaOH at an applied potential 0.3 V with respect to Ag/AgCl.

FIG. 7B shows amperometric response from in a region of from 2000 to 2800 s toward 5 to 50 μM of glucose concentration corresponding to the indicated region of FIG. 7A.

FIG. 7C shows the corresponding calibration plot between the current and glucose concentration.

DETAILED DESCRIPTION OF THE INVENTION

Figure 1A:
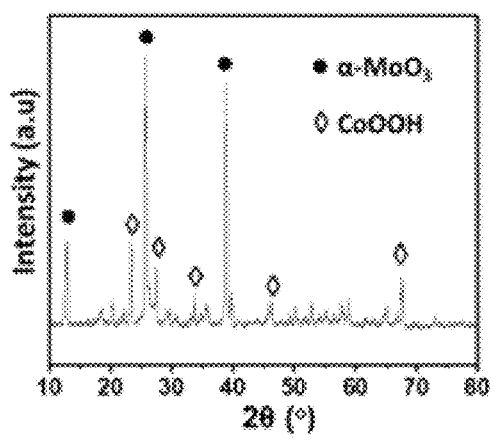
FIG. 1A shows the X-ray diffraction (XRD) pattern of MoCo composite.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean size of the primary particles.

Composite

According to a first aspect, the present disclosure relates to a composite, comprising planar molybdenum oxide microstructures and cobalt oxyhydroxide microstructures disposed on a surface of the planar molybdenum oxide microstructures.

The planar molybdenum oxide microstructures have a mean thickness of 0.5 to 5 μm, preferably 0.6 to 4.75 μm, preferably 0.7 to 4.5 μm, preferably 0.8 to 4.25 μm, preferably 0.9 to 4.0 μm, preferably 1.0 to 3.75 μm, preferably 1.1 to 3.5 μm, preferably 1.2 to 3.25 μm, preferably 1.3 to 3.0 μm, preferably 1.4 to 2.9 μm, preferably 1.5 to 2.7 μm, preferably 1.6 to 2.5 μm, preferably 1.7 to 2.3 μm, preferably 1.8 to 2.2 μm, preferably 1.9 to 2.1 μm, preferably 2.0 μm. The planar molybdenum oxide microstructures have a mean width of 1 to 10 μm, preferably 1.5 to 9.0 μm, preferably 2.0 to 8.0 μm, preferably 2.5 to 7.5 μm, preferably 3.0 to 7.0 μm, preferably 3.25 to 6.75 μm, preferably 3.5 to 6.5 μm, preferably 3.75 to 6.25 μm, preferably 4.0 to 6.0 μm, preferably 4.25 to 5.75 μm, preferably 4.5 to 5.5 μm, preferably 4.75 to 5.25 μm, preferably 4.9 to 5.1 μm, preferably 5 μm. In general, the planar molybdenum oxide microstructures should have a mean length which is at least substantially equal to (e.g., within about 10%, preferably within about 7.5%, preferably within about 5% of) the width of the planar molybdenum oxide microstructures. There is no specific limit to a length of the planar molybdenum oxide microstructures. In some embodiments, the planar molybdenum oxide microstructures can have a mean length which is up to 1,000 μm, preferably up to 900 μm, preferably up to 800 μm, preferably up to 700 μm, preferably up to 600 μm, preferably up to 500 μm, preferably up to 400 μm, preferably up to 300 μm, preferably up to 250 μm, preferably up to 200 μm, preferably up to 150 μm, preferably up to 125 μm, preferably up to 100 μm, preferably up to 90 μm, preferably up to 80 μm, preferably up to 70 μm, preferably up to 60 μm, preferably up to 50 μm. In some embodiments, the planar molybdenum oxide microstructures can have a mean length which is equal to or greater than 1,000 μm. The term "particle size measure" can be used to refer to the width, thickness, length, or a combination of these.

In general, the planar molybdenum oxide microstructures can be any suitable shape which is substantially planar (e.g., flat). Examples of such shapes include, but are not limited to flat rectangles, squares, triangles, and other polygons; discs; sheets; plates and platelets; belts; ribbons; bands; and the like. In preferred embodiments, the planar molybdenum oxide microstructures have an elongated shape, that is, a length of the planar molybdenum oxide microstructures is greater than the width of the planar molybdenum oxide microstructures. Examples of such elongated shapes include sheets; plates and platelets; belts; ribbons; bands; and the like. In some embodiments, the elongated structures are substantially planar or formed from substantially planar portions but adopt an overall non-planar configuration. For example, a belt, ribbon, or other similar structure can adopt a configuration in which the flat belt or ribbon is bent or curved such that the belt or ribbon forms an undulating wave-like shape. In another example, a belt, ribbon, or other similar structure can be bent such that it forms an angular structure having a first portion and a second portion which are substantially non-coplanar. In another example, a belt, ribbon, or other similar structure can be rolled or coiled. However, dense agglomerates, aggregates, or other collections of planar structures which have a large number of orientations of the planes, such as "nanoflower" structures are not shapes which the planar molybdenum oxide microstructures are envisioned as taking in any embodiments. The planar molybdenum oxide microstructures may be referred to as "nanobelts", "nanoribbons", "microbelts", or "microribbons", preferably the structures are nanobelts. In some embodiments, nanobelts can be used to refer to planar structures as described above which have an aspect ratio defined as a ratio of a length to a width of the nanobelt in a range of 10:1 to 1000:1, preferably 12.5:1 to 750:1, preferably 15:1 to 500:1, preferably 17.5:1 to 250:1, preferably 20:1 to 200:1, preferably 22.5:1 to 175:1, preferably 25:1 to 150:1, preferably 27.5:1 to 125:1, preferably 30:1 to 100:1, preferably 32.5:1 to 90:1, preferably 35:1 to 85:1, preferably 37.5:1 to 80:1, preferably 40:1 to 75:1. The aspect ratio can be a mean aspect ratio.

In some embodiments, the planar molybdenum oxide microstructures have a uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of planar molybdenum oxide microstructures having a different shape. As used herein, the term "non-uniform shape" refers to an average consistent shape that differs by more than 10% of the distribution of planar molybdenum oxide microstructures having a different shape.

In some embodiments, the planar molybdenum oxide microstructures of the present disclosure are monodisperse, having a coefficient of variation or relative standard deviation, expressed as a percentage and defined as the ratio of a particle size measure standard deviation ($\sigma$) to a particle size measure mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the planar molybdenum oxide microstructures of the present disclosure are monodisperse having a particle size measure distribution ranging from 80% of the average particle size measure to 120% of the average particle size measure, preferably 90-110%, preferably 95-105% of the average particle size measure. Such monodispersity can be measured for the width, thickness, length, or a combination of these. For example, the planar molybdenum oxide microstructures can have a monodisperse thickness, but a non-monodisperse width. In some embodiments, the planar molybdenum oxide microstructures are not monodisperse.

In general, the particle size (e.g., the length, width, and/or thickness) may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The molybdenum oxide is crystalline by PXRD. The planar molybdenum oxide microstructures may be single-crystalline or polycrystalline. In embodiments where the planar molybdenum oxide microstructures are polycrystalline, the planar molybdenum oxide microstructures can be formed from smaller molybdenum oxide particles. Such molybdenum oxide particles can be arranged regularly or irregularly to give rise to the planar molybdenum oxide microstructures.

In general, the molybdenum oxide can be any suitable oxide of molybdenum known to one of ordinary skill in the art. Examples of such oxides of molybdenum include, but are not limited to, molybdenum(IV) oxide ($MoO_2$, also known as molybdenum dioxide), molybdenum(VI) oxide ($MoO_3$, also known as molybdenum trioxide), $Mo_3O_{23}$, $Mo_4O_{11}$, and $Mo_{17}O_{47}$. In some embodiments, the molybdenum oxide is $MoO_3$. The $MoO_3$ can be any suitable polymorph or combination of polymorphs of $MoO_3$. Examples of polymorphs of $MoO_3$ include, but are not limited to $\alpha$-$MoO_3$, $\beta$-$MoO_3$, $\beta'$-$MoO_3$, and h-$MoO_3$. In preferred embodiments is $\alpha$-$MoO_3$. In some embodiments, the molybdenum oxide is substantially free of oxides of molybdenum which are not $MoO_3$. In some embodiments, the molybdenum oxide is substantially free of molybdenum hydroxide. In some embodiments, the $\alpha$-$MoO_3$ is substantially free of polymorphs which are not $\alpha$-$MoO_3$.

The cobalt oxyhydroxide microstructures have a mean size of 1 to 8 $\mu$m, preferably 1.25 to 7.5 $\mu$m, preferably 1.5 to 7 $\mu$m, preferably 1.75 to 6.5 $\mu$m, preferably 2.0 to 6.0 $\mu$m, preferably 2.25 to 5.75 $\mu$m, preferably 2.5 to 5.5 $\mu$m, preferably 2.75 to 5.25 $\mu$m, preferably 3.0 to 5.0 $\mu$m, preferably 3.25 to 4.75 $\mu$m, preferably 3.5 to 4.5 $\mu$m, preferably 3.75 to 4.25 $\mu$m, preferably 3.9 to 4.1 $\mu$m, preferably 4.0 $\mu$m.

In some embodiments, the cobalt oxyhydroxide microstructures are spheres, spheroids, lentoids, ovoids, or portions (e.g., hemispheres) or combinations thereof. In some embodiments, the cobalt oxyhydroxide microstructures have a uniform shape as described above. Alternatively, the shape may be non-uniform, as described above.

In some embodiments, the cobalt oxyhydroxide microstructures of the present disclosure are monodisperse, having a coefficient of variation or relative standard deviation, expressed as a percentage and defined as the ratio of a particle size measure standard deviation (a) to a particle size measure mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the cobalt oxyhydroxide microstructures of the present disclosure are monodisperse having a particle size measure distribution ranging from 80% of the average particle size measure to 120% of the average particle size measure, preferably 90-110%, preferably 95-105% of the average particle size measure. In some embodiments, the cobalt oxyhydroxide microstructures are not monodisperse.

The cobalt oxyhydroxide is crystalline by PXRD. The cobalt oxyhydroxide microstructures may be single-crystalline or polycrystalline. In embodiments where the cobalt oxyhydroxide microstructures are polycrystalline, the cobalt oxyhydroxide can be formed from smaller cobalt oxyhydroxide particles. Such cobalt oxyhydroxide particles can be arranged regularly or irregularly to give rise to the cobalt oxyhydroxide microstructures. In some embodiments, the cobalt oxyhydroxide microstructures are agglomerates of smaller cobalt oxyhydroxide particles. Such smaller cobalt oxyhydroxide particles may have any suitable shape, examples of which include, but are not limited to spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, and mixtures thereof. Such smaller cobalt oxyhydroxide particles may be single-crystalline or polycrystalline. Such smaller cobalt oxyhydroxide particles are monodisperse, having a coefficient of variation or relative standard deviation, expressed as a percentage and defined as the ratio of a particle size measure standard deviation ($\sigma$) to a particle size measure mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the smaller cobalt oxyhydroxide particles are monodisperse having a particle size measure distribution ranging from 80% of the average particle size measure to 120% of the average particle size measure, preferably 90-110%, preferably 95-105% of the average particle size measure. In some embodiments, the smaller cobalt oxyhydroxide particles are not monodisperse.

In general, the cobalt oxyhydroxide can be any suitable polymorph or combination of polymorphs of cobalt oxyhydroxide known to one of ordinary skill in the art. Examples of polymorphs of cobalt oxyhydroxide include, but are not limited to $\alpha$-CoOOH, $\beta$-CoOOH, and $\gamma$-CoOOH. In preferred embodiments, the cobalt oxyhydroxide is $\alpha$-CoOOH. In some embodiments, the cobalt oxyhydroxide is substantially free of oxides of cobalt, such as CoO, $Co_2O_3$, and $Co_3O_4$. In some embodiments, the cobalt oxyhydroxide is substantially free of cobalt hydroxide. In some embodiments, the $\alpha$-CoOOH is substantially free of polymorphs which are not $\alpha$-CoOOH.

The cobalt oxyhydroxide microstructures are disposed on a surface of the planar molybdenum oxide microstructures. In general, a single cobalt oxyhydroxide microstructure can contact any number of surfaces of the planar molybdenum oxide microstructures. For example, a single cobalt oxyhydroxide microstructure can contact a single surface of a single planar molybdenum oxide microstructure. Such a surface may be associated with or defined by the length and width, the length and thickness, or the width and thickness of the planar molybdenum oxide microstructure. For example, in a substantially rectangular planar molybdenum oxide microstructure, the single cobalt oxyhydroxide microstructure can be disposed on a top surface, a bottom surface, a side surface (e.g., a left side surface or a right side surface), or an end surface. There is no requirement, however, that the cobalt oxyhydroxide microstructure contact only one such surface. In general, a single cobalt oxyhydroxide microstructure can contact any number of suitable surfaces of a single planar molybdenum oxide microstructure. For example, a single cobalt oxyhydroxide microstructure can contact two, three, four, five, six, seven, eight, or more such surfaces. In the example of the substantially rectangular planar molybdenum oxide microstructure, the single cobalt oxyhydroxide microstructure can contact up to five surfaces chosen from the top, bottom, left, right, front end, and back end surfaces. To contact all six such surfaces, however, would require that the single cobalt oxyhydroxide microstructure encompass the entire rectangular planar molybdenum oxide microstructure and is not envisioned in any embodiment.

In general, there is no limit to the number of cobalt oxyhydroxide microstructures which may be present on a single planar molybdenum oxide microstructure. There is also no limit to the number of planar molybdenum oxide microstructures which may be in contact with a single cobalt oxyhydroxide microstructure. For example, a single cobalt oxyhydroxide microstructure can contact one planar molybdenum oxide microstructure as described above. A single cobalt oxyhydroxide microstructure can contact two or more planar molybdenum oxide microstructures. For example, the two or more planar molybdenum oxide microstructures can be joined, overlapping, touching, fused, or otherwise connected or in contact. A single cobalt oxyhydroxide microstructure can be disposed on surfaces of both or all such planar molybdenum oxide microstructures. In another example, a single cobalt oxyhydroxide microstructure can be disposed on surfaces of two or more planar molybdenum oxide microstructures which are not otherwise connected or in contact. The cobalt oxyhydroxide microstructure can form or act as a bridge between such planar molybdenum oxide microstructures.

In some embodiments, the composite is substantially free of a metal hydroxide material by PXRD. Examples of such metal hydroxide materials include, but are not limited to molybdenum hydroxide, cobalt hydroxide, iron hydroxide, and the like.

In some embodiments, the composite is substantially free of a carbon nanomaterial. Examples of carbon nanomaterials include, but are not limited to carbon nanotubes, carbon nanobuds, carbon nanoscrolls, carbon dots, activated carbon, carbon black, graphene, graphene oxide, reduced graphene oxide, and nanodiamonds. The composite being substantially free of a carbon nanomaterial is not intended to exclude the use of carbon nanomaterials the in the structure or preparation of the electrochemical sensor described below. The carbon nanomaterial being part of the composite covers situations in which there are carbon nanomaterials which are not constituent parts of other parts of the electrochemical sensor, in particular an electrode, and are disposed upon, mixed with, or otherwise intimately intermingled with either the planar molybdenum oxide microstructures and/or the cobalt oxyhydroxide microstructures. For example, a composite in which the planar molybdenum oxide microstructures are coated with a carbon nanomaterial or one in which there is a carbon nanomaterial disposed between the planar molybdenum oxide microstructures and the cobalt oxyhydroxide microstructures would be considered to be disposed upon, mixed with, or otherwise intimately intermingled. Similarly, an electrochemical sensor in which the composite is disposed on an electrode, which may comprise a carbon nanomaterial, then a carbon nanomaterial (which may be different from or the same as the carbon nanomaterial of which the electrode may be comprised) is disposed upon the composite would be considered to be disposed upon, mixed with, or otherwise intimately intermingled.

Method of Forming the Composite

The present disclosure also relates to method of forming the composite, the method comprising mixing a molybdenum source and an aminotriazole to form a first intermediate, calcining the first intermediate at 500 to 900° C., preferably 525 to 875° C., preferably 550 to 850° C., preferably 575 to 825° C., preferably 600 to 800° C., preferably 625 to 775° C., preferably 650 to 750° C., preferably 675 to 725° C., preferably 690 to 710° C., preferably 700° C. for 1 to 12 hours, preferably 2 to 10 hours, preferably 3 to 9 hours, preferably 4 to 8 hours, preferably 4.5 to 7.5 hours, preferably 5.0 to 7.0 hours, preferably 5.5 to 6.5 hours, preferably 6.0 hours to form planar molybdenum oxide microstructures, treating the planar molybdenum oxide microstructures with an acid to form activated microstructures, mixing the activated microstructures, a cobalt ion source, and water to form a reaction mixture, and hydrothermally treating the reaction mixture at 175 to 245° C., preferably 180 to 240° C., preferably 185 to 235° C., preferably 190 to 230° C., preferably 195 to 225° C., preferably 200 to 220° C., preferably 205 to 215° C., preferably 210° C. for 12 to 96 hours, preferably 16 to 88 hours, preferably 20 to 80 hours, preferably 24 to 72 hours, preferably 28 to 68 hours, preferably 32 to 64 hours, preferably 36 to 60 hours, preferably 40 to 56 hours, preferably 44 to 52 hours, preferably 48 hours to form the composite.

In general, the molybdenum source may be any suitable molybdenum-containing material. In some embodiments, the molybdenum source is a salt or coordination compound comprising a molybdenum atom. In such a salt or coordination compound, the molybdenum atom may be in any oxidation state, such as $-4$, $-2$, $-1$, $0$, $+1$, $+2$, $+3$, $+4$, $+5$, or $+6$. Such a salt or coordination compound may contain other atoms, ions, or molecules which act to charge balance or to fill the coordination sphere about the molybdenum atom. Examples of such atoms, ions, or molecules include, but are not limited to halides such as chloride, bromide, and iodide; nitrate; acetate; sulfate; sulfite; carbon monoxide; mesitylene; cyclopentadiene; phosphate; alkyl ligands such as methyl, ethyl, and isopropyl; and alkoxide ligands such as methoxide, ethoxide, and isopropoxide. In some embodiments, the molybdenum source is a salt or coordination compound comprising a molybdate ion. It should be understood that as used herein, the term "molybdate ion" refers to both the oxoanion $MoO_4^{-2}$ commonly referred to as simply "molybdate" as well as related oxoanions which comprise multiple molybdenum metal centers which may be connected through oxygen atoms to form discrete or polymeric structures such as dimolybdate ($Mo_2O_7^{2-}$), trimolybdate ($Mo_3O_{10}^{-2}$), tetramolybdate ($Mo_4O_{13}^{-2}$), and the like. In preferred embodiments, the molybdenum source is ammonium molybdate.

In some embodiments, the aminotriazole is 3-amino-1H, 2,4-triazole.

In some embodiments, solid forms of the aminotriazole and the molybdenum source may be mixed as solids by a technique such as stirring, grinding, milling, or the like. In some embodiments, the first intermediate is formed by mixing the aminotriazole and the molybdenum source in a solvent and removing the solvent. In such embodiments, the solvent may be any suitable liquid, such as water and an organic solvent such as alcohols such as methanol, ethanol, n-propanol, 2-propanol (also known as isopropanol), ethylene glycol, diethylene glycol, and glycerol; hydrocarbons such as pentane, hexane, and heptane; ketones such as acetone and methyl ethyl ketone; esters such as ethyl acetate; amides such as dimethylformamide; ethers such as tetrahydrofuran, diglyme, and diethyl ether; nitriles such as acetonitrile; halogenated organic solvents such as methylene chloride (also known as dichloromethane), carbon tetrachloride, and chloroform; aromatic organic solvents such as benzene and xylene; amines such as trimethylamine and pyridine; and mixtures thereof. In some embodiments, the solvent is ethanol. In some embodiments, the solvent is water. In some embodiments, the molybdenum source is dissolved or suspended in ethanol and the aminotriazole is dissolved or suspended in ethanol.

In general, the solvent may be removed by any suitable means. That is, the first intermediate may be separated from the solvent by any suitable method or with any suitable equipment for separating a solid and liquid known to one of ordinary skill in the art, such as decantation, centrifugation, filtration, evaporation, and distillation. The removal of the solvent may involve heating the precursor mixture to a temperature below 150° C., preferably below 125° C., preferably below 100° C., preferably below 90° C., preferably below 85° C. Such heating may be advantageous for ensuring complete removal of the solvent prior to calcination.

After formation, the planar molybdenum oxide microstructures may be washed with a suitable wash solvent, such as a water, an organic solvent, or a mixture thereof as described above. The planar molybdenum oxide microstructures may be separated from the wash solvent by any suitable method or with any suitable equipment as described above.

Examples of suitable acids which may be used in the treating of the planar molybdenum oxide microstructures include, but are not limited to sulfuric acid, hydrochloric acid, nitric acid, formic acid, acetic acid, chloric acid, perchloric acid, hydrobromic acid, hydroiodic acid, phosphoric acid, and the like. Examples of unsuitable acids include hydrofluoric acid, silicic acid, hexafluorosilicic acid, fluorosulfonic acid, hexafluorophosphoric acid, and the like. The presence of silicon and/or fluorine (or ions thereof) in such acids may degrade the molybdenum oxide; convert the oxide to a fluoride, oxyfluoride, or other such material; or may produce an inorganic coating of a silicon- or fluorine-comprising material on the surface of the planar molybdenum oxide microstructures which is undesirable. In some embodiments, the acid is nitric acid. In an embodiment, the aqueous acid has a concentration of 1 to 10 M, preferably 1.5 to 9 M, preferably 2 to 8 M, preferably 2.5 to 7.5 M, preferably 3 to 7 M, preferably 3.5 to 6.5 M, preferably 4 to 6 M, preferably 4.25 to 5.75 M, preferably 4.5 to 5.5 M, preferably 4.75 to 5.25 M, preferably 4.9 to 5.1 M, preferably 5 M.

Examples of suitable cobalt ion sources include, but are not limited to cobalt (II) chloride, cobalt (II) bromide, cobalt (II) iodide, cobalt (II) nitrate, cobalt (II) acetate, cobalt (II) formate, cobalt (II) sulfate, cobalt (II) perchlorate, cobalt (II) oxalate, and cobalt (II) tetrafluoroborate. In some embodiments, the cobalt ion source is cobalt (II) nitrate.

Following the hydrothermal treating, the composite may be washed as described above.

Electrochemical Sensor

The present disclosure also relates to an electrochemical sensor, comprising an electrode, the composite disposed on the electrode, and a polymeric coating disposed on the composite.

In some embodiments, the electrochemical sensor is substantially free of an enzyme. In preferred embodiments, the electrochemical sensor is devoid of an enzyme. Of particular note are enzymes which degrade, convert, or otherwise utilize as a substrate glucose.

In some embodiments, the electrode is a glassy carbon electrode.

Examples of suitable materials which may be used as the polymeric coating include, but are not limited to polyethylene, polypropylene, polytetrafluoroethylene (PTFE), polyvinylidene fluoride (PVDF), styrene butadiene rubber, a tetrafluoroethylene hexafluoro ethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE), branched polyethyleneimine (bPEI), an ethylene-acrylic acid copolymer such as poly 2-acrylamido-2-methylpropane sulfonic acid (PAMPS), polypyrrole, polynaphthalene, polythiophene, polyethylene oxide, polyethyldioxythiophene (PEDOT). polyacetylenes, polypyrrole polystyrene sulfonate, polythiophenes (PT), polyanilines, EHPT (poly(3-(2-ethylhexyl) thiophene), ionomers (e.g., Nafion®), poly(3,4 ethylene dioxythiophene) (PEDOT), PEDOT polystyrene sulfonate (PSS/PEDOT) and Nafion @. In some embodiments, the polymeric coating is Nafion®.

In general, the composite and/or the polymeric coating can be disposed using any suitable technique and with any suitable materials known to one of ordinary skill in the art. For example, the composite may be suspended in a suitable solvent, such as water and/or an organic solvent as described above and drop cast onto the electrode.

In some embodiments, the electrochemical sensor has an anodic peak centered at greater than 0.2 to 0.28 V, preferably 0.205 to 0.270 V, preferably 0.21 to 0.26 V, preferably 0.215 to 0.25 V, preferably 0.22 to 0.24 V, preferably 0.225 to 0.235 V, preferably 0.23 V and a cathodic peak centered at 0.15 to 0.2 V, preferably 0.16 to 0.195 V, preferably 0.17 to 0.190 V, preferably 0.175 to 0.185 V preferably 0.180 V, as measured vs Ag/AgCl in 0.1 M NaOH.

Method of Detecting the Presence of Glucose

The present disclosure also relates to a method of detecting the presence of glucose in an analyte, the method comprising immersing a working electrode comprising the electrochemical sensor, a reference electrode, and a counter electrode in an analyte comprising a dilute hydroxide base, applying a voltage to the working electrode and counter electrode, measuring a current response to determine at least one selected from a cathodic peak voltage, an anodic peak voltage, and a steady-state current, and determining the presence of glucose in the analyte based on at least one selected from the group consisting of the cathodic peak voltage, the anodic peak voltage, and the steady-state current.

In some embodiments, the voltage is applied in a range of 0.01 to 0.5 V, preferably 0.05 to 0.475 V, preferably 0.1 to 0.45 V, preferably 0.15 to 0.425 V, preferably 0.2 to 0.4 V, preferably 0.225 to 0.375 V, preferably 0.25 to 0.35 V, preferably 0.275 to 0.325 V, preferably 0.29 to 0.31 V, preferably 0.3 V.

In some embodiments, the dilute hydroxide base is 0.1 M NaOH.

In some embodiments, the analyte has a pH of 8 to 14, preferably 9 to 13.5, preferably 10 to 13, preferably 11 to 12.5, preferably 12.

In some embodiments, the reference electrode is an Ag/AgCl electrode.

In some embodiments, the method has a glucose detection limit of 10 to 100 μM, preferably 15 to 95 μM, preferably 20 to 90 μM, preferably 25 to 85 μM, preferably 30 to 80 μM, preferably 35 to 75 μM, preferably 40 to 70 μM, preferably 45 to 65 μM, preferably 50 to 60 μM, preferably 55 to 57.5. The detection limit refers to a minimum concentration of glucose in the analyte which causes a response having a signal to noise ratio of at least 3.

In some embodiments, the method has a glucose sensitivity of 4 to 8 $\mu$A mM$^{-1}$ cm$^{-2}$, preferably 5.0 to 7.5 $\mu$A mM$^{-1}$ cm$^{-2}$, preferably 5.5 to 7.0 $\mu$A mM$^{-1}$ cm$^{-2}$, preferably 5.75 to 6.75 $\mu$A mM$^{-1}$ cm$^{-2}$, preferably 6.0 to 6.5 $\mu$A mM$^{-1}$ cm$^{-2}$, preferably 6.1 to 6.4 $\mu$A mM$^{-1}$ cm$^{-2}$, preferably 6.15 to 6.35 $\mu$A mM$^{-1}$ cm$^{-2}$, preferably 6.20 to 6.30 $\mu$A mM$^{-1}$ cm$^{-2}$, preferably 6.225 to 6.250 $\mu$A mM$^{-1}$ cm$^{-2}$.

In some embodiments, the method has a linear amperometric current response in a glucose concentration range of 0.001 to 5.0 mM, preferably 0.002 to 4.5 mM, preferably 0.003 to 2.5 mM, preferably 0.005 to 1.0 mM.

In some embodiments, the determining is based on a steady-state current and the method produces a detectable response within 20 s, preferably within 17.5 s, preferably within 15 s, preferably within 14 s, preferably within 13 s, preferably within 12.5 s, preferably within 12 s, preferably within 11.5 s, preferably within 11 s. The time period between exposure to an analyte comprising glucose and the response is known as a response time. This response time can be associated with an increase in current from some pre-exposure value to the steady-state value at the conclusion of the response time. The steady-state current can be associated with a value of current which is stable (i.e., constant to a value within 15%, preferably within 12.5%, preferably within 10%, preferably within 7.5%, preferably within 5%, preferably within 2.5% of a mean current value) over a period of at least 15 s, preferably at least 20 s, preferably at least 30 s, preferably at least 35 s, preferably at least 40 s, preferably at least 45 s, preferably at least 50 s, preferably at least 55 s, preferably at least 60 s. In some embodiments, the steady-state current can be associated with a value of current which is stable over a period of up to 1 min, preferably up to 1.5 min, preferably up to 2 min, preferably up to 2.5 min, preferably up to 3 min, preferably up to 3.5 min, preferably up to 4 min, preferably up to 4.5 min, preferably up to 5 min, preferably up to 6 min, preferably up to 7 min, preferably up to 8 min, preferably up to 9 min, preferably up to 10 min.

In some embodiments, the method can be performed at a temperature of 15 to 50° C., preferably 17.5 to 47.5° C., preferably 20 to 45° C., preferably 22.5 to 42.5° C., preferably 25 to 40° C. In some embodiments, the method produces a maximum signal at a temperature of 30 to 35° C.

In some embodiments, the method is selective to glucose, that is, it does not show a response to common biological constituents which may be oxidized including but not limited to sodium chloride, urea, and lactate present in amounts of 0.001 to 5.0 mM, preferably 0.002 to 4.5 mM, preferably 0.003 to 2.5 mM, preferably 0.005 to 1.0 mM.

In general, the analyte may be any suitable analyte. If the analyte is not a liquid, it may be dissolved in a suitable solvent to which the dilute hydroxide base may be added, for example water. In some embodiments, the analyte is a biological fluid, such as blood, saliva, urine, and the like. In general, the analyte may be pre-treated using any suitable method known to one of ordinary skill in the art prior to performing of the method.

The examples below are intended to further illustrate protocols for the preparation and use of the composite and electrochemical sensor and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Preparation of MoO$_3$

MoO$_3$ nanobelts were synthesized as follows: 3 g of ammonium molybdate was dissolved in 100 of ethanol and continuously stirred for 1 h at room temperature. Then, 0.8 g of 3-Amino-1H,2,4-triazole was added to the mixture and stirred for 1 h. The resultant solution was dried overnight at temperature of 85° C. The resulting solid was calcined at 700° C. for 6 h.

Preparation of MoCo Nanocomposite

For the surface activation, a proper stoichiometric amount of MoO$_3$ nanobelts were treated with nitric acid (5 M). The hydrothermal technique was utilized to synthesize MoCo nanocomposite. 2 mmol of Co(NO$_3$)$_2$'6H$_2$O was dissolved in 15 mL deionized (DI) water. Then, 35 mL of a solution containing nitric acid treated MoO$_3$ was added slowly. The metal solution was kept under vigorous stirring for 30 min at room temperature to obtain a homogeneous mixture. After that, the resultant solution was transferred into a 100 mL Teflon-lined stainless-steel autoclave for 48 h at 210° C. and cooled naturally. The final product was collected and washed several times with deionized water and ethanol, respectively, then dried for 8 h at 60° C.

Fabrication of Modified GCE

Prior to electrode preparation, the surface of GCE was polished with alumina powder (1.0 $\mu$m, then 0.3 $\mu$m, and then 0.05 $\mu$m respectively). Then it was washed sequentially with ethanol and DI water in the ultrasonicator for 10 min and kept for drying at room temperature. The GCE/MoCo/Nafion was fabricated as follows: 5 mg of prepared MoCo nanocomposite was vigorously sonicated with 0.5 mL of ethanol and 0.5 mL of DI water. Afterward, 5 $\mu$L of the suspension was dropped onto the bare GCE and dried at room temperature for 1 h. Lastly, 2 $\mu$L of Nafion wad drop casted on the surface to catch MoCo nanocomposite.

Characterization and Electrochemical Measurements

A Rigaku Benchtop Miniflex X-ray diffraction (XRD, CuK$\alpha$ radiation) was utilized to analyze the crystalline structure of the synthesized sample. The surface morphologies and the elemental compositions of the nanoparticles were investigated by scanning electron microscopy (SEM) coupled with energy dispersive X-ray spectroscopy (EDX) system and transmission electron microscope (TEM). The electrochemical characterization, including cyclic voltammetry and amperometric measurements, was accomplished using a corrtest electrochemical workstation (Model CS1034). The conventional three electrode system was used, with the modified GCE as working electrode, a platinum wire as counter electrode, and Ag/AgCl (saturated 3 M KCl) as reference electrode. Thus, all potentials were referenced with respect to Ag/AgCl. The measurements were conducted at room temperature in the basic medium 0.1 M NaOH at pH of 12.

Microstructural Characterization

To analyze the crystallinity of as-synthesized MoCo material, the XRD patterns were collected. These are presented in FIG. 1A. XRD patterns showed two phases of MoCo composite structure, an $\alpha$-MoO$_3$ phase and a CoOOH phase. The strong diffraction peaks at 13.02°, 26.060 and 39.320 attributed to the (020), (040), and (060) crystal planes of $\alpha$-MoO$_3$ (see JCPDS 05-0508), while the peaks appeared at 23.42°, 27.31°, 33.78°, 46.190 and 67.640 corresponding to the (110), (120), (130), (121), and (231) planes of CoOOH, respectively (see JCPDS 26-0480) [Rahmani, M. B., et. al., Sensors and Actuators B: Chemical, 2010, 145, 13-19; Aleman-Vazquez, L. O., et. al., Molecules, 2011, 16, 5916-5927; and Liu, S., et. al., Ionics, 2020, 26, 3531-3542, each of which is incorporated herein by reference in its entirety]. The crystallite size (D) was estimated using Scherrer's equation (D=k$\lambda$/$\beta$ cos $\theta$) and found to be 23.59 nm, where k is a dimensionless shape factor ($\approx$0.89), $\lambda$ is the x-ray wavelength, $\beta$ is the full width-at-half-maximum length of the reflection and $\theta$ is the Bragg angle [Liu, Y., et. al., Scientific Reports, 2017, 1845, incorporated herein by reference in its entirety].

Figure 1B:
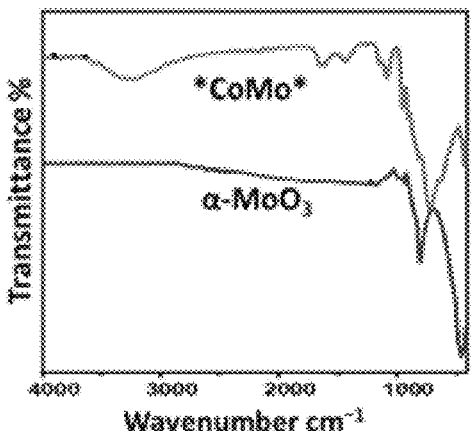
FIG. 1B shows the Fourier-Transform Infrared (FTIR) spectra of α-MoO$_3$ and MoCo composite.

Functional groups of pure $\alpha$-MoO$_3$ and MoCo composite were determined through FTIR spectroscopy as shown in FIG. 1B. The FTIR spectra of pure $\alpha$-MoO$_3$ belt exhibited intense peak at 808 cm$^{-1}$ corresponding to the bending vibrational modes of metal-oxide Mo-0-Mo [Kothaplamoot-til, S., et. al., Clean Technologies and Environmental Policy, 2019, 21, 1549-1561, incorporated herein by reference in its entirety]. While, for MoCo composite, the broad band at the 3280 cm$^{-1}$ was attributed 0-H stretching mode [Kumar, S., et. al., Polymer Bulletin, 2020, 77, 441-457, incorporated herein by reference in its entirety]. A small peak at 2138 cm$^{-1}$ was assigned to the special 0-H bond that is in interaction with other by near atoms of cobalt. The narrow peak appeared at 1620 cm$^{-1}$ assigned to the Co—O double bond in the crystal structure of CoOOH [Antony, H., et. al., Electrochimica Acta, 2005, 51, 745-753; Jagadale, A. D., et. al., Materials Research Bulletin, 2012, 47, 672-676, each of which is incorporated herein by reference in its entirety]. The metal-oxide Mo—O—Mo band was shifted to low wavenumber at 713 cm$^{-1}$, and the bands 800-420 cm$^{-1}$ were assigned to the characteristic of the metal-oxygen bending vibrations and to Co—O$_2$ complex in the oxide [Kandalkar, S. G., et. al., Synthetic Metals, 2010, 160, 1299-1302, incorporated herein by reference in its entirety].

Figure 2A:
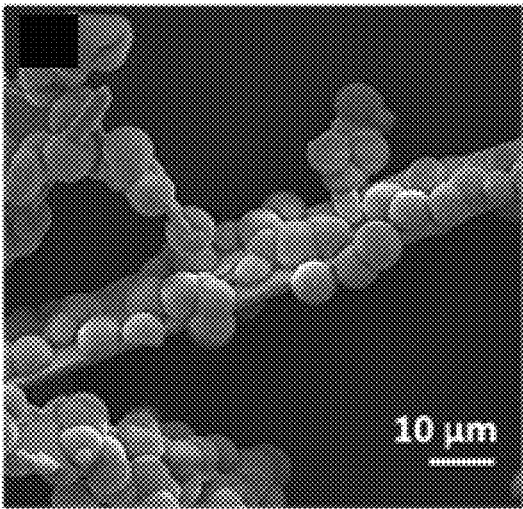
FIGS. 2A-2B are scanning electron microscopy (SEM) images of MoCo composite at low and high magnification, respectively.
Figure 2B:
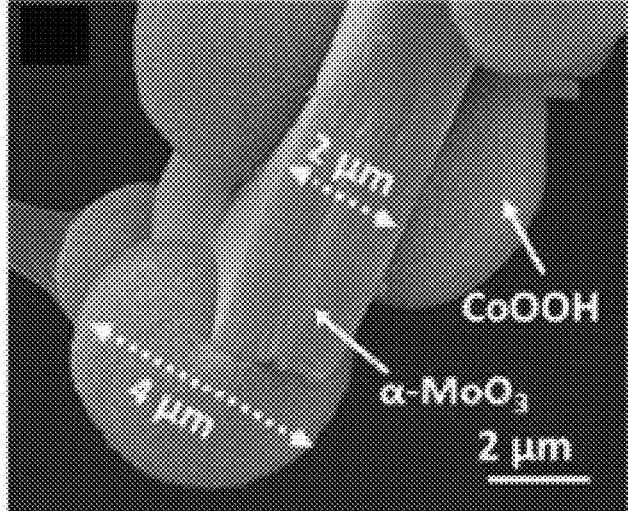

Surface morphology of MoCo was studied through SEM and TEM. It is evidently observed that the SEM images of MoCo (FIGS. 2A-2B) showed $\alpha$-MoO$_3$ planar belt-like structure, with the width and thickness was 5 $\mu$m and 2 $\mu$m, respectively, decorated by a uniform CoOOH spherical structure with a diameter of 4 $\mu$m. Similarly, TEM images in FIGS. 3A-3B illustrated that the structure of the MoCo has regular morphology of $\alpha$-MoO$_3$ belt structure and decorated with CoOOH spheres. Elemental maps of Co, Mo, C and O obtained through energy dispersive x-ray spectroscopy (EDX) are shown in FIGS. 4A-4D. The homogeneous distribution of Co in the spherical structure, Mo element in the belt structure, and O elements can be seen. The C is attributed to the sample holder.

Electrochemical Characterization

Figure 5:
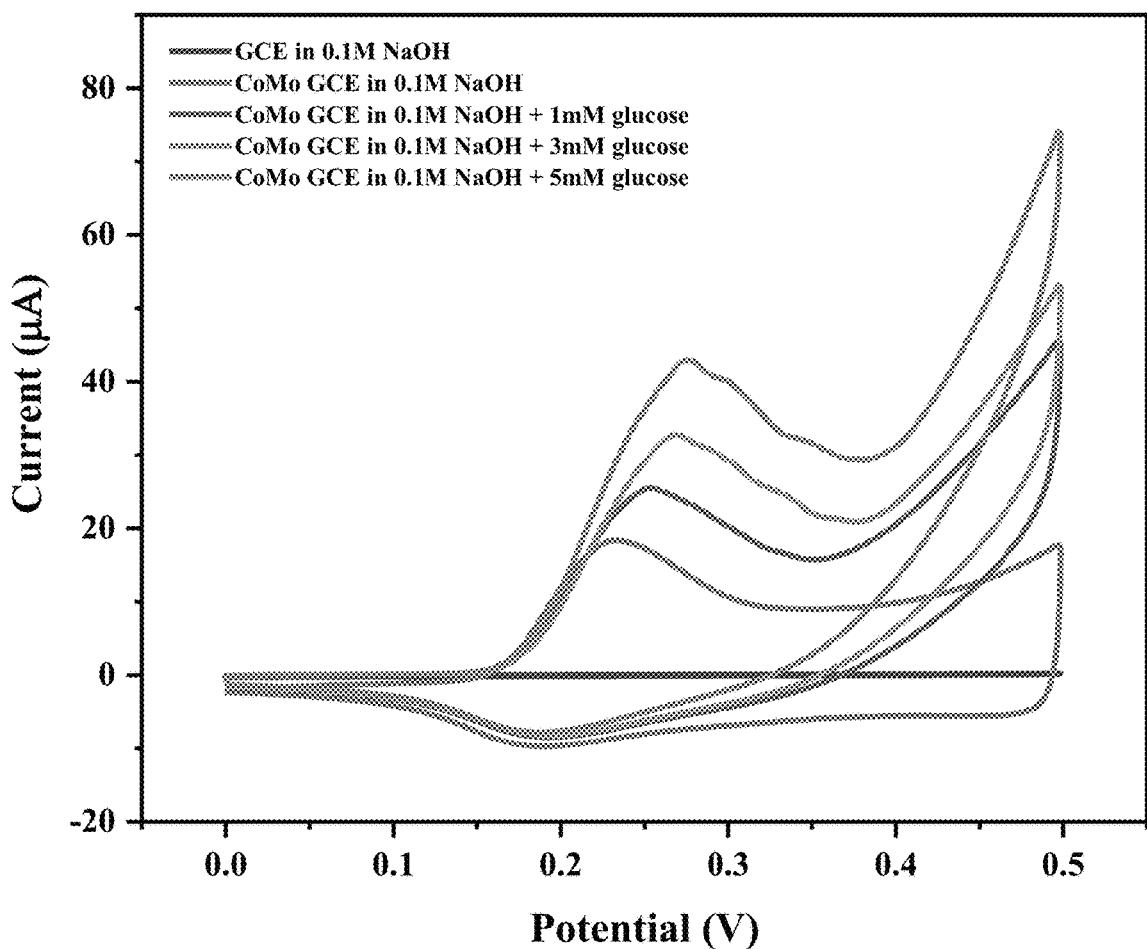
FIG. 5 shows the CV curves of bare GCE and GCE/MoCo/Nafion in 0.1 M NaOH solution and in the presence of various glucose concentration (1 mM, 3 mM, and 5 mM) at scan rate of 20 mV/s.

Cyclic voltammetry (CV) was utilized to investigate the electrochemical behavior of modified GCE/MoCo/Nafion in 0.1M NaOH electrolyte in the presence and the absence of glucose as depicted in FIG. 5. The NaOH concentration (0.1 M) was selected in the examinations based on the common concentration [Huang, J., et. al., Electrochimica Acta, 2014, 136, 41-46; Ramachandran, K. and Babu, K., Scientific Reports, 6, 36583; Zheng, W., et. al., Sensors and Actuators B: Chemical, 2019, 282, 187-196; and Zhang, F., et. al., Colloids and Surfaces A: Physicochemical and Engineering Aspects, 2020, 602, 125076, each of which is incorporated herein by reference in its entirety]. For comparison, the bare GCE and coated GCE/MoCo/Nafion were analyzed in 0.1 M NaOH without glucose at the scan rate of 20 mV s$^{-1}$. The redox peaks were clearly observed with the modified electrode due to the presence of MoCo, while the bare GCE exhibited the passive behavior. The strong broad anodic peak of modified GCE/MoCo/Nafion cantered at 0.23 V which could be ascribed to the synergic oxidation action of Co and Mo ions. In detail, CO$^{2+}$ ion transformed to Co$^{3+}$ then further oxidized into Co$^{4+}$ ion at higher potentials. The cathodic peak was observed under the reveres scan, cantered at 0.18 V attributed to the reduction of Co$^{4+}$/Co$^{3+}$ and Co$^{3+}$/Co$^{2+}$[Li, H., et. al., Nanoscale Research Letters, 2019, 14, 135, incorporated herein by reference in its entirety]. When the glucose introduced to the NaOH solution, the currents of anodic oxidation peak were shown to increase while the cathodic reduction peaks were shown to decrease. The expected catalysis mechanism of MoCo nanocomposite toward glucose in the alkaline condition mainly relies on the active species CoOOH and MoO$_3$ [Ma, G., et. al., Electrochimica Acta, 2016, 220, 545-553; Sharma, M., et. al., Journal of Physics D: Applied Physics, 2017, 50, 475401, each of which is incorporated herein by reference in its entirety]. According to various literature reports, the following equations could plausibly express the proposed mechanism of electrochemical reaction [Zhang, Y., et. al., Applied Surface Science, 2020, 505, 144636; Xu, H., et. al., Electrochimica Acta, 2020, 331, 135295; and Casella, I. G. and Gatta, M., Journal of Electroanalytical Chemistry, 2002, 534, 31-38, each of which is incorporated herein by reference in its entirety]:

$$CoOOH+OH^-\rightarrow CoO_2+H_2O+e^- \qquad (1)$$

$$CoO_2+C_6H_{12}O_6(glucose)\rightarrow CoO(OH)+C_6H_{10}O_6(gluconolactone) \qquad (2)$$

$$MoO_3+OH^-+C_6H_{12}O_6(glucose)\rightarrow Mo(OOH)_x+C_6H_{10}O_6(gluconolactone)+H_2O+xe^- \qquad (3)$$

The analyzed glucose can be efficiently oxidized into gluconolactone through the generated Co$^{4+}$ ion under the alkaline medium. At the same time, CoO$_2$ is reduced to CoO(OH) which is results in the increasing of anodic peak current through inducing the oxidation of CoO(OH) to CoO$_2$. In contrary, FIG. 5 revealed the gradual reduction in the cathodic peak current with increasing the glucose concentration owing to the consumption of Co$^{4+}$ in the glucose electrooxidation. Likewise, the increase in the anodic current can be attributed to the reduction of the active Mo ions on the GCE working electrode which results in the further oxidation of glucose molecules. The nanobelt structure of MoO$_3$ exhibited advantages in high sensing ability toward glucose due to its large surface area across a wide range of glucose concentrations. Furthermore, a slight positive shift in the anodic peak with increasing the glucose concentrations can be observed. This can be explained by the increasing of the internal resistance (solution and interface resistance) through the adsorption of glucose and the oxidized intermediates at the surface of GCE/MoCo/Nafion [Karikalan, N., et. al., ACS Applied Materials and Interfaces, 2016, 8, 22545-22553; and Karikalan, N., et. al., RSC Advances, 2016, 6, 48523-48529, each of which is incorporated by reference in its entirety].

Figure 6A:
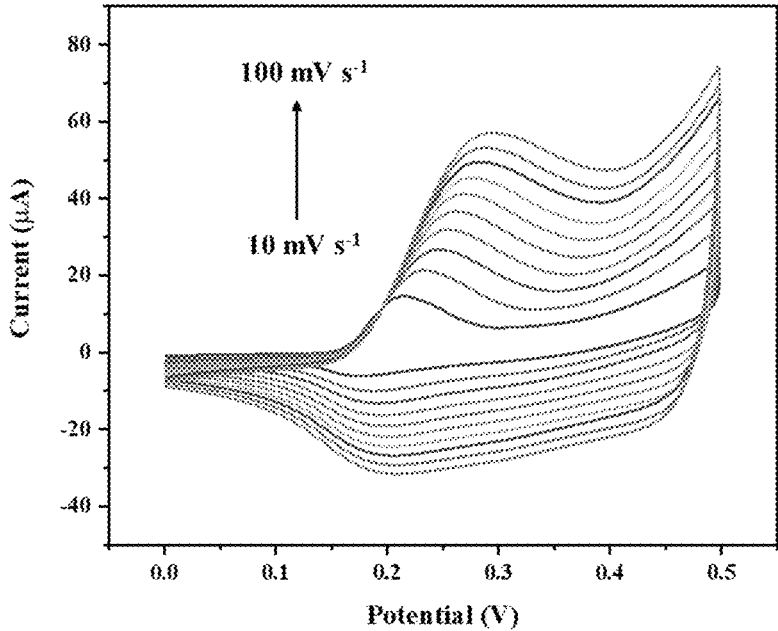
FIG. 6A shows the CV curves of GCE/MoCo/Nafion in 0.1 M NaOH solution in the presence of 1 mM glucose with different scan rates from 10 to 100 mV/s.
Figure 6B:
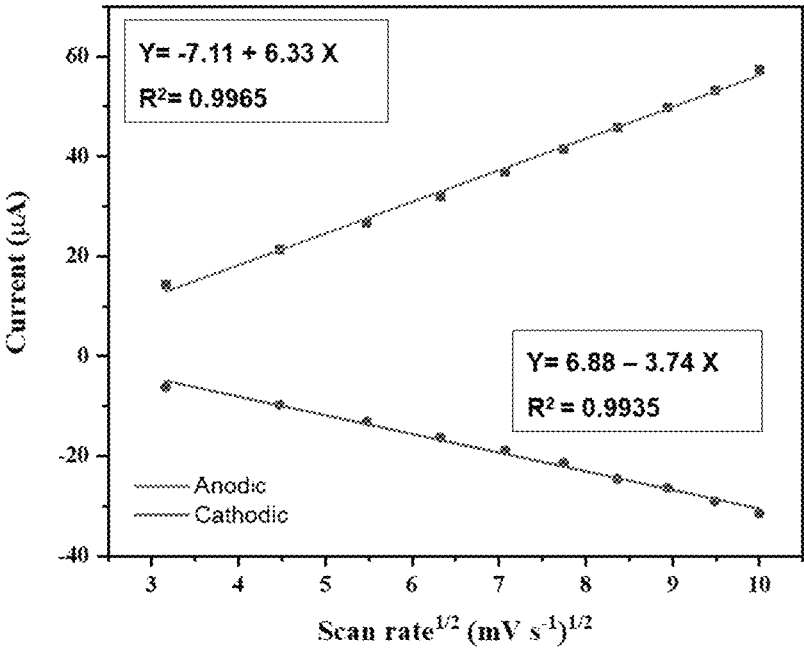
FIG. 6B shows the calibration plot of anodic and cathodic peak currents vs. square root of scan rate.

The influence of scan rate variation on glucose oxidation was investigated to understand the reaction kinetics and the electrocatalytic properties of modified GCE/MoCo/Nafion electrode. FIG. 6A illustrates the CV curves of GCE/MoCo/Nafion analyzed in 0.1M NaOH containing 1 mM glucose at various scan rates in the range of 10-100 mV/s. It is obvious that both anodic I$_{pa}$ and cathodic I$_{pc}$ peak currents exhibit gradual increase with increasing the scan rate. However, the anodic E$_{pa}$ and cathodic E$_{pc}$ peak potentials are slightly shifted to the positive and negative regions respectively, for the reasons explained above. FIG. 6B shows the excellent linearity of currents to the square root of scan rate. The linear regression equations of anodic and cathodic peak currents are $I_{pa}$ ($\mu$A)=$-7.11+6.33$ $v^{1/2}$ (mV/s) ($R^2$=0.9965) and $I_{pc}$ ($\mu$A)=$6.88-3.74$ $v^{1/2}$ (mV/s) ($R^2$=0.9935) respectively. These finding validate that the glucose oxidation reaction on GCE/MoCo/Nafion surface is a diffusion-controlled process [see Li, H., et. al., Nanoscale Research Letters, 2019, 14, 135].

Amperometric Response of Glucose

Amperometry measurements were carried out to evaluate the accurate current response of glucose at the surface of modified GCE/MoCo/Nafion electrode. FIGS. 7A-7B illustrate the amperometric response I-t curve obtained in 20 mL of stirred 0.1 M NaOH at applied potential 0.3 V with successive addition of various glucose concentration. A vigorous stirring was applied to ensure well glucose mixed with the electrolyte and attain a homogeneous glucose solution. A notable enhancement was observed in current densities which increased linearly with the glucose addition. The current value was reached steady state in approximately 11 s, indicating a fast rate of oxidation reaction between the redox surface of the modified electrode GCE/MoCo/Nafion and glucose. The corresponding calibration curve is shown in FIG. 7C based on the amperometric results with linear fitting equation $I_{pa}$($\mu$A)=0.0097 $\mu$A+4.41$\times$10$^{-4}$ $\mu$A$\cdot\mu$M$^{-1}$ $C_{glucose}$. The modified GCE/MoCo/Nafion sensor exhibited very high linear correlation coefficient ($R^2$=0.9959) with a detection limit of 56 $\mu$M at (S/N=3), and sensitivity of 6.246 $\mu$AmM$^{-1}$ cm$^{-2}$.

Electrochemical Interference Analysis

Figure 8:
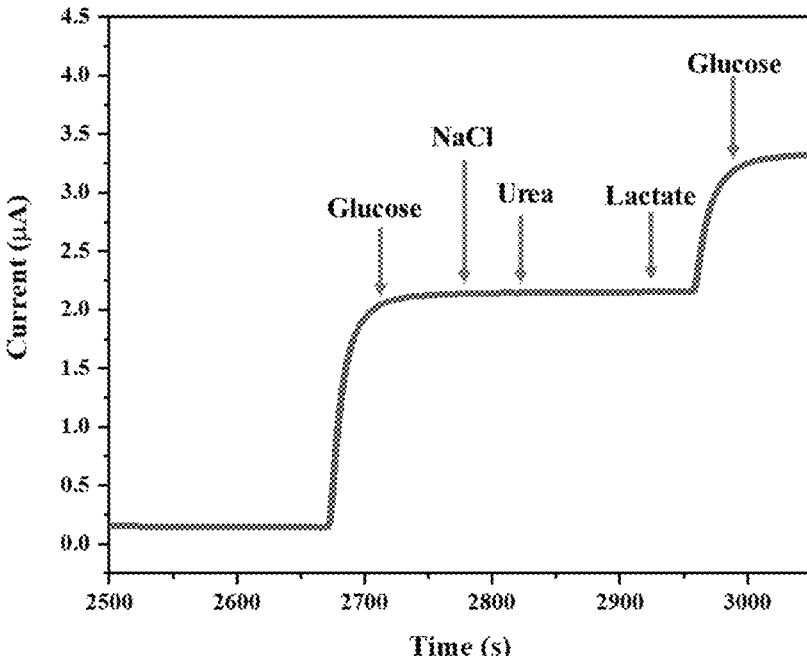
FIG. 8 shows a plot of the interference examination of modified GCE/MoCo/Nafion in 0.1 M NaOH at 0.3 V with successive step addition of 1.0 mM glucose and 0.1 mM (at physiological concentration) of common interferences.

The sensor selectivity is an essential parameter for the practical applications, it is indicated the sensor response to glucose in the presence of other interfering species. Several oxidative interfering analytes such as urea, lactate, NaCl usually coexist with glucose in samples such as human blood. FIG. 8 shows the amperometric I-t curve response in 20 mL stirred electrolyte of 0.1 M NaOH at applied potential 0.3 V by the successive addition of 1.0 mM glucose, and 0.1 mM NaCl, Urea, and Lactate. A significant increase in the amperometric current response was observed with 1.0 mM glucose addition. However, there was no obvious current response upon the addition of 0.1 mM NaCl, Urea, and Lactate. Meanwhile, the modified GCE/MoCo/Nafion sensor exhibited a negligible change in the amperometric current response toward competing species in comparison with that of glucose. Accordingly, these findings demonstrate that the modified electrode possesses high selectivity toward glucose as a non-enzymatic sensor and its excellent applicability for real sample examination.

Temperature, Reusability, and Stability Study

Figure 9A:
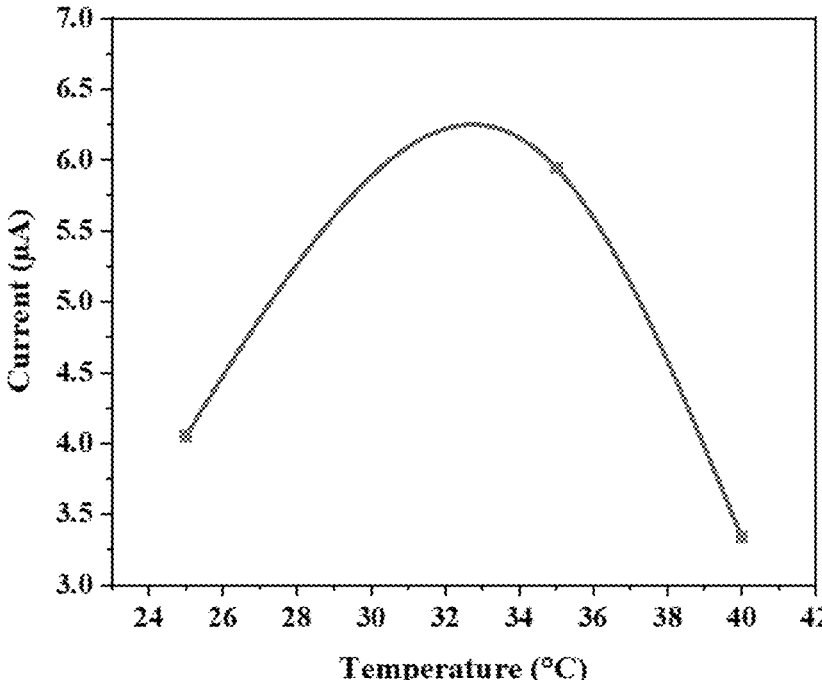
FIG. 9A shows a plot of the temperature effect on the current response to glucose of the GCE/MoCo/Nafion sensor in 0.1M NaOH solution.

The electrochemical performance of modified GCE/MoCo/Nafion electrode was examined in 0.1M NaOH under various temperature from 25 to 40° C. FIG. 9A illustrates the effect of temperature on amperometric response. The current response showed an increasing behavior with respect to the increasing in temperature reaching its maximum value at 35° C. Thereafter, the current inclined down exhibiting the decreasing trend with further temperature increase.

Figure 9B:
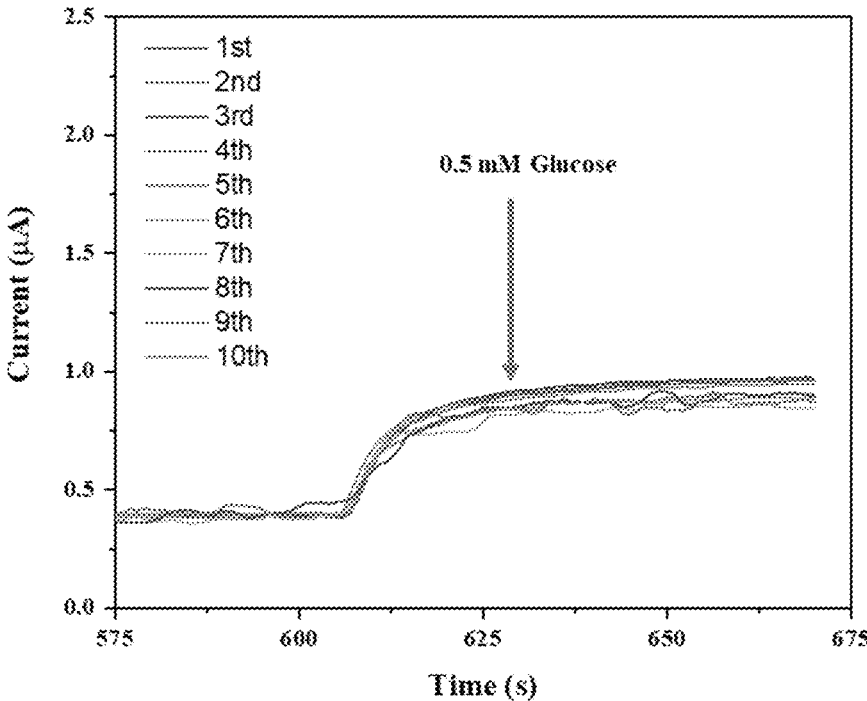
FIG. 9B shows the amperometric current response of the sensor upon repeated additions of 0.5 mM glucose.

One of the most attractive characteristics of biosensor is the reusability. FIG. 9B reveals the good reusability through amperometric response on the addition of 0.5 mM glucose for ten separate additions. The current signals are very close and in consistence with each other for each time with a relative standard deviation of 3.76%.

Another significant parameter of the electrochemical biosensors in practical application is the long-term stability. In the repeated additions in FIG. 9B, there was no obvious decrement in the current response toward electrooxidation of the glucose after one month of electrode storing in comparison with its initial current response. These results demonstrate outstanding long-term stability of GCE/MoCo/Nafion glucose sensor.

The invention claimed is:

1. A composite, comprising:
planar molybdenum oxide microstructures having a mean thickness of 0.5 to 5 $\mu$m and a mean width of 1 to 10 $\mu$m; and
cobalt oxyhydroxide microstructures having a mean size of 1 to 8 $\mu$m disposed on a surface of the planar molybdenum oxide microstructures, wherein
the molybdenum oxide is crystalline by PXRD and the cobalt oxyhydroxide is crystalline by PXRD.

2. The composite of claim 1, wherein the molybdenum oxide is $\alpha$-MoO$_3$.

3. The composite of claim 1, which is substantially free of a metal hydroxide material by PXRD.

4. The composite of claim 1, which is substantially free of a carbon nanomaterial.

5. A method of forming the composite of claim 1, the method comprising:
mixing a molybdenum source and an aminotriazole to form a first intermediate;
calcining the first intermediate at 500 to 900° C. for 1 to 12 hours to form planar molybdenum oxide microstructures;
treating the planar molybdenum oxide microstructures with an acid to form activated microstructures;
mixing the activated microstructures, a cobalt ion source, and water to form a reaction mixture; and
hydrothermally treating the reaction mixture at 175 to 245° C. for 12 to 96 hours to form the composite.

6. The method of claim 5, wherein the molybdenum source is ammonium molybdate.

7. The method of claim 5, wherein the aminotriazole is 3-amino-1H,2,4-triazole.

8. The method of claim 5, wherein the cobalt ion source is cobalt (II) nitrate.

9. An electrochemical sensor, comprising:
an electrode;
the composite of claim 1 disposed on the electrode; and
a polymeric coating disposed on the composite.

10. The electrochemical sensor of claim 9, which is substantially free of an enzyme.

11. The electrochemical sensor of claim 9, wherein:
the electrode is a glassy carbon electrode; and
the polymeric coating is Nafion.

12. The electrochemical sensor of claim 9, having an anodic peak centered at greater than 0.2 to 0.28 V and a cathodic peak centered at 0.15 to 0.2 V as measured vs Ag/AgCl in 0.1 M NaOH.

13. A method of detecting the presence of glucose in an analyte, the method comprising:
immersing a working electrode comprising the electrochemical sensor of claim 9, a reference electrode, and a counter electrode in an analyte comprising a dilute hydroxide base;
applying a voltage to the working electrode and counter electrode;
measuring a current response to determine at least one selected from a cathodic peak voltage, an anodic peak voltage, and a steady-state current; and determining the presence of glucose in the analyte based on at least one selected from the group consisting of the cathodic peak voltage, the anodic peak voltage, and the steady-state current.

14. The method of claim 13, wherein the voltage is applied in a range of 0.01 to 0.5 V.

15. The method of claim 13, wherein the dilute hydroxide base is 0.1 M NaOH.

16. The method of claim 13, wherein the analyte has a pH of 8 to 14.

17. The method of claim 13, wherein the reference electrode is an Ag/AgCl electrode.

18. The method of claim 13, having a glucose detection limit of 10 to 100 $\mu$M.

19. The method of claim 13, having a glucose sensitivity of 4 to 8 $\mu$A mM$^{-1}$ cm$^{-2}$.

20. The method of claim 13, having a linear amperometric current response in a glucose concentration range of 0.001 to 5.0 mM.

\* \* \* \* \*